(12) United States Patent
Okubo et al.

(10) Patent No.: US 9,476,559 B2
(45) Date of Patent: Oct. 25, 2016

(54) VEHICLE HEADLAMP (71) Applicant: ICHIKOH INDUSTRIES, LTD., Isehara-shi, Kanagawa-ken (JP)

(72) Inventors: Yasuhiro Okubo, Isehara (JP); Kotoka Inoue, Isehara (JP)

(73) Assignee: ICHIKOH INDUSTRIES, LTD., Isehara-Shi (JP)

(*) Notice: Subject to any disclaimer, the term of this patent is extended or adjusted under 35 U.S.C. 154(b) by 0 days.

(21) Appl. No.: 14/646,120

(22) PCT Filed: Nov. 1, 2013

(86) PCT No.: PCT/JP2013/079780
§ 371 (c)(1),
(2) Date: May 20, 2015

(87) PCT Pub. No.: WO2014/080748
PCT Pub. Date: May 30, 2014

(65) Prior Publication Data
US 2015/0316224 A1    Nov. 5, 2015

(30) Foreign Application Priority Data
Nov. 20, 2012   (JP) ................. 2012-254236

(51) Int. Cl.
*F21S 8/10* (2006.01)
*G02B 19/00* (2006.01)
*F21Y 101/02* (2006.01)

(52) U.S. Cl.
CPC ........ *F21S 48/1275* (2013.01); *F21S 48/1154* (2013.01); *F21S 48/1258* (2013.01); *F21S 48/1283* (2013.01); *G02B 19/0028* (2013.01); *G02B 19/0061* (2013.01); *F21Y 2101/02* (2013.01)

(58) Field of Classification Search
CPC ............. F21S 48/1275; F21S 48/1154; F21S 48/1258; F21S 48/1291; F21S 48/115; F21S 48/125; B60Q 1/04
See application file for complete search history.

(56) References Cited

U.S. PATENT DOCUMENTS

| | | | |
|---|---|---|---|
| 8,070,339 B2 | 12/2011 | Koike |
| 8,123,388 B2 | 2/2012 | Ookubo |
| 8,848,300 B2 | 9/2014 | Matsunaga et al. |
| 2005/0254254 A1 | 11/2005 | Moseler et al. |
| 2008/0253000 A1 | 10/2008 | Matsunaga et al. |
| 2009/0257240 A1 | 10/2009 | Koike |
| 2010/0165652 A1 | 7/2010 | Ookubo |
| 2011/0011133 A1 | 1/2011 | Moseler et al. |
| 2011/0205748 A1 | 8/2011 | Yatsuda |

FOREIGN PATENT DOCUMENTS

| | | | |
|---|---|---|---|
| EP | 1 584 863 A2 | 10/2005 |
| EP | 2 202 453 A2 | 6/2010 |
| EP | 2 237 080 A1 | 10/2010 |
| JP | 03-122902 A | 5/1991 |
| JP | H10-3805 A | 1/1998 |
| JP | 2005-302718 A | 10/2005 |
| JP | 2008-262876 A | 10/2008 |
| JP | 2009-181845 A | 8/2009 |
| JP | 2009-199938 A | 9/2009 |
| JP | 2010-153180 A | 7/2010 |

*Primary Examiner* — Karabi Guharay
(74) *Attorney, Agent, or Firm* — Foley & Lardner LLP (57) ABSTRACT

A vehicle headlamp is provided with a semiconductor light source and a lens. The light emission center of the semiconductor light source is arranged at a reference focal point of the lens, or in the proximity thereof. The incident surface of the lens is configured such that upper parts and the lower parts above and below the reference focal point form pairs. Light distribution patterns formed by the upper parts are shifted upwards relative to light distribution patterns formed by the lower parts. As a result, the vehicle headlamp is capable of suppressing occurrence of color bands due to lens spectral phenomena.

6 Claims, 5 Drawing Sheets

VEHICLE HEADLAMP

TECHNICAL FIELD

The present invention relates to a lens direct type vehicle headlamp provided with a semiconductor-type light source and a lens. In particular, the present invention relates to a vehicle headlamp that suppresses the occurrence of color bands due to spectral phenomena of a lens.

BACKGROUND ART

A vehicle headlamp of this type is conventional (for example, Patent Literatures 1, 2, 3). Hereinafter, a conventional vehicle headlamp will be described.

The vehicle headlamp of Patent Literature 1 is configured such that light from a light source is reflected by a reflector, a part of the reflected light is hidden by a mask, the remaining reflected light passes through a lens, and radiates as a low beam. The vehicle headlamp of Patent literature 1 is configured to suppress the occurrence of color hands by providing an area having optical scattering effects on the lens surface.

The vehicle headlamp of Patent Literature 2 is configured such that light from a light source is reflected by a reflector, a part of the reflected light is cut off by a shade, and the remaining reflected light passes through a projection lens, and radiates as a light distribution pattern having a cutoff line. In the vehicle headlamp of Patent Literature 2, the projection lens comprises an upper first projection lens part having a large refractive index and a lower second projection lens part having a small refractive index, thereby suppressing the occurrence of color bands due to spectral phenomena of a lens.

Further, the vehicle headlamp of Patent literature 3 is configured such that light from a semiconductor-type light source is reflected by a reflector, a part of the reflected light is cut off by a shade, the remaining reflected light passes through a projection lens, and radiates as a light distribution pattern having a cutoff line. In the vehicle headlamp of Patent Literature 3, a light scattering part is provided in the projection lens, thereby suppressing the occurrence of color hands due to spectral phenomena of a lens.

CITATION LIST

Patent Literature

Patent Literature 1: JP-A-2005-302718
Patent Literature 2: JP-A-2009-181845
Patent Literature 3: JP-A-2009-199938

SUMMARY OF THE INVENTION

Problems to be Solved by the Invention

In such a vehicle headlamp, it is important to suppress the occurrence of color bands due to spectral phenomena of a lens.

A problem to be solved by the present invention is to suppress the occurrence of color bands due to spectral phenomena of a lens.

Means for Solving the Problem

A vehicle headlamp according to first aspect of the present invention, comprising a semiconductor-type light source and a lens, characterized in that: an emission center of the semiconductor-type light source is arranged at a reference focal point of the lens, or in the proximity thereof, at least a part of the lens is configured of an upper part and a lower part, and at least one of a light distribution pattern formed by the upper part and a light distribution pattern formed by the lower part is shifted at least one of upward and downward relative to the other light distribution patterns.

The vehicle headlamp according to second aspect of the present invention, characterized in that: the lens is configured of a first part including a reference optical axis, and a second part around the first part, and a micro-diffusion element group is provided in at least one of an incident surface and an exit surface of the second part.

The vehicle headlamp according to third aspect of the present invention, characterized in that the light distribution pattern formed by the upper part is shifted upward relative to the light distribution pattern formed by the lower part.

The vehicle headlamp according to fourth aspect of the present invention, characterized in that the light distribution pattern formed by the lower part is shifted downward relative to the light distribution pattern formed by the upper part.

Effects of the Invention

In the vehicle headlamp of the present invention, an incident surface of a lens is configured of an upper part and a lower part with respect to a reference focal point. Thus, due to chromatic aberrations of a lens, in a light distribution pattern formed by the upper part, a band-shaped red (hereinafter referred to as "red band") occurs in the upper peripheral part, and a band-shaped blue (hereinafter referred to as "blue band") occurs in the lower peripheral part. On the other hand, due to chromatic aberrations of a lens, in a light distribution pattern formed by the lower part, a blue hand occurs in the upper peripheral part, and a red band occurs in the lower peripheral part.

In the vehicle headlamp of the invention, at least one of the light distribution pattern formed by the upper part and the light distribution pattern formed by the lower part is shifted at least one of upward and downward relative to the other light distribution pattern. In other words, the light distribution pattern formed by the upper part is shifted upward relative to the light distribution pattern formed by the lower part. Or, the light distribution pattern formed by the lower part is shifted downward relative to the light distribution pattern formed by the upper part. Or, a part of the light distribution pattern formed by a part of the upper part is shifted upward relative to a part of the light distribution pattern formed by a part of the corresponding lower part, and the other part of the light distribution pattern formed by the other part of the lower part is shifted downward relative to the other part of the light distribution pattern formed by the other part of the corresponding upper part.

As a result, in the vehicle headlamp of the invention, the red band in the upper peripheral part of the light distribution pattern formed by the upper part substantially overlaps on the blue band in the upper peripheral part of the light distribution pattern formed by the lower part. Further, the blue band in the lower peripheral part of the light distribution pattern formed by the upper part substantially overlaps on the red band in the lower peripheral part of the light distribution pattern formed by the lower part. Thus, based on the principle of color mixing (additive mixing), it is possible to suppress the occurrence of color bands due to spectral phenomena of a lens.

MODES FOR CARRYING OUT THE INVENTION

Figure 4:
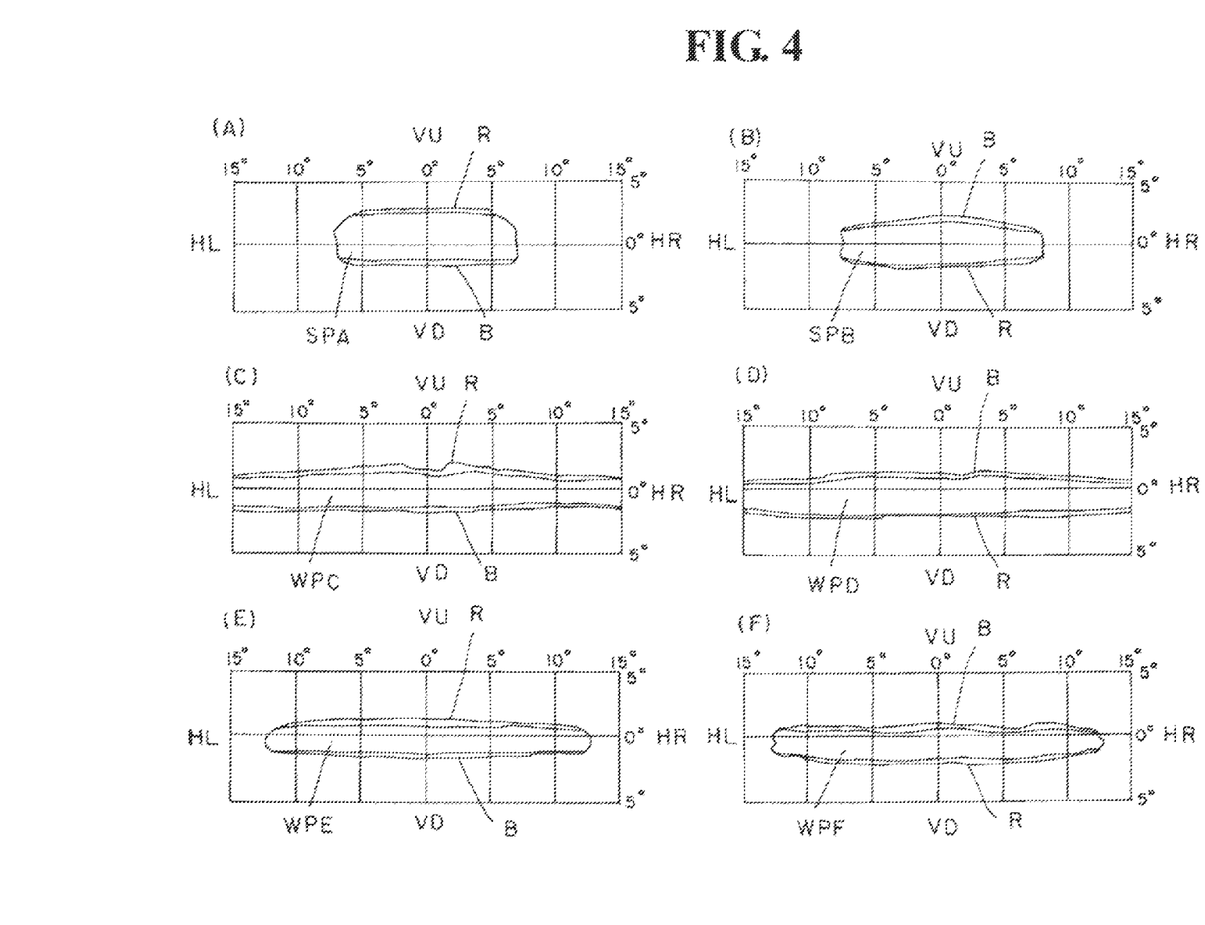
FIG. 4 shows explanatory diagrams showing a light distribution pattern of each configuration (section) of a lens.
Figure 5:
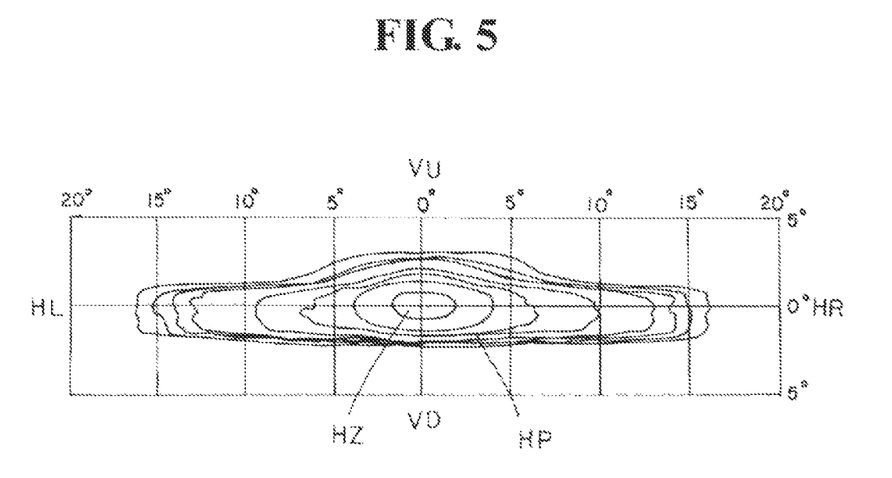
FIG. 5 is an explanatory diagram showing a high beam light distribution pattern formed by superimposing (synthesizing) a light distribution pattern of each configuration (partition) of a lens.
Figure 6:
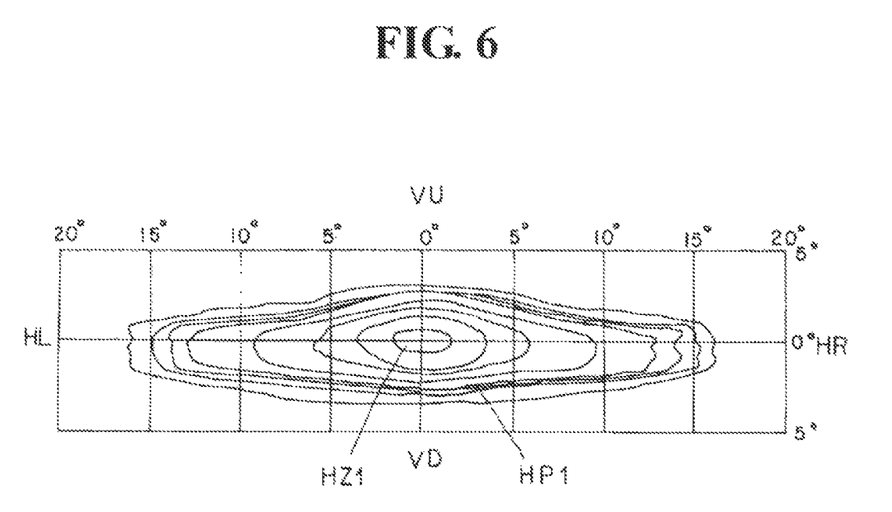
FIG. 6 is an explanatory diagram showing a high beam light distribution pattern in the case when a micro-diffusion element group is provided in a lens.

Hereinafter, embodiments (examples) of the present invention will be described with reference to the drawings. The invention is not limited to the embodiments. In FIGS. 4 to 6, a symbol "VU-VD" denotes an upper and lower vertical line of the screen. A symbol "HL-HR" denotes a left and right horizontal line of the screen. FIG. 4 shows explanatory diagrams showing a simplified light distribution pattern on the screen plotted by computer simulation. FIGS. 5 and 6 are explanatory diagrams of isointensity curves showing a simplified light distribution pattern on the screen plotted by computer simulation. In the explanatory diagrams of isointensity curves, the central isointensity curve shows a high intensity: the outside isointensity curve shows a low intensity. In this specification and claims, front, back, top, bottom, left, right are front, back, top, bottom, left, right when a vehicle headlamp according to the present invention is mounted on a vehicle.

(Description of Configuration of the Embodiment)

Hereinafter, a configuration of the vehicle headlamp according to the embodiment will be described. In the drawings, a symbol 1 denotes a vehicle headlamp according to the embodiment (e.g., a headlamp). The vehicle headlamp 1 is mounted on the left and right ends of the front of a vehicle.

(Description of Vehicle Headlamp 1)

Figure 1:
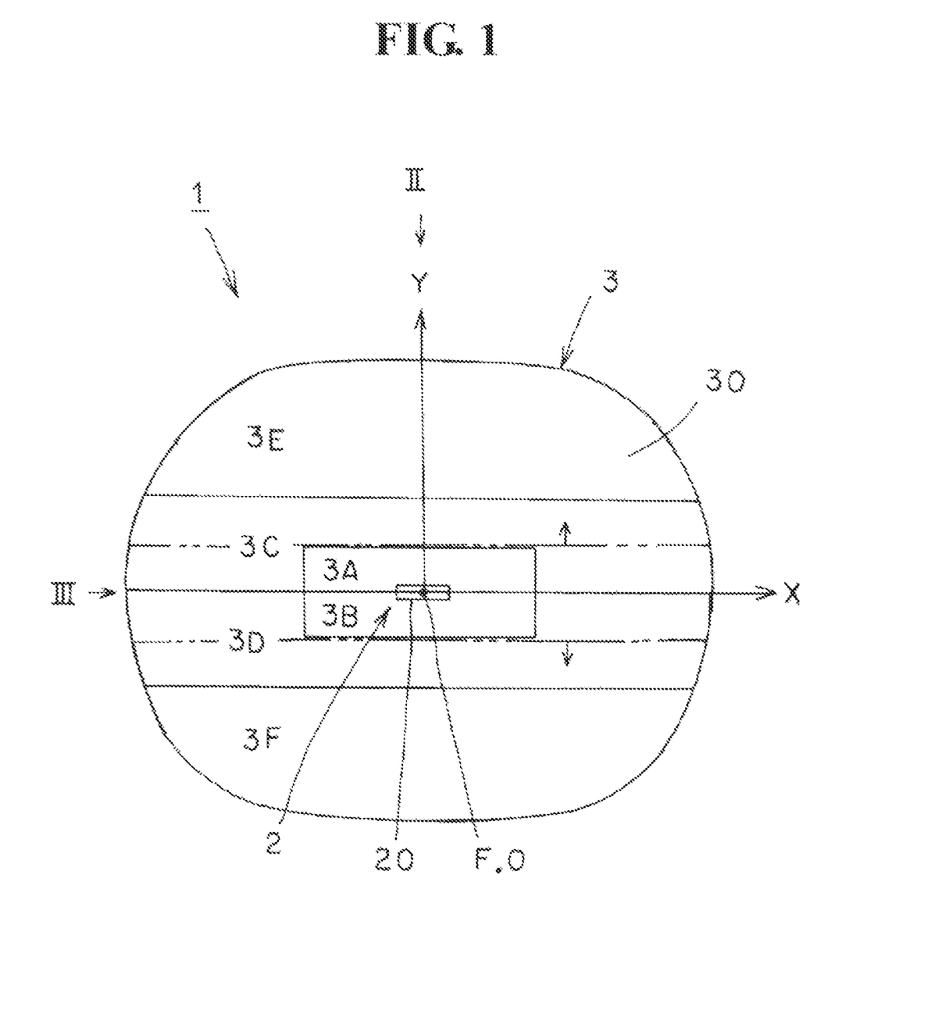
FIG. 1 is a rear view of a lens and a semiconductor-type light source showing an embodiment of the vehicle headlamp according to the present invention.
Figure 2:
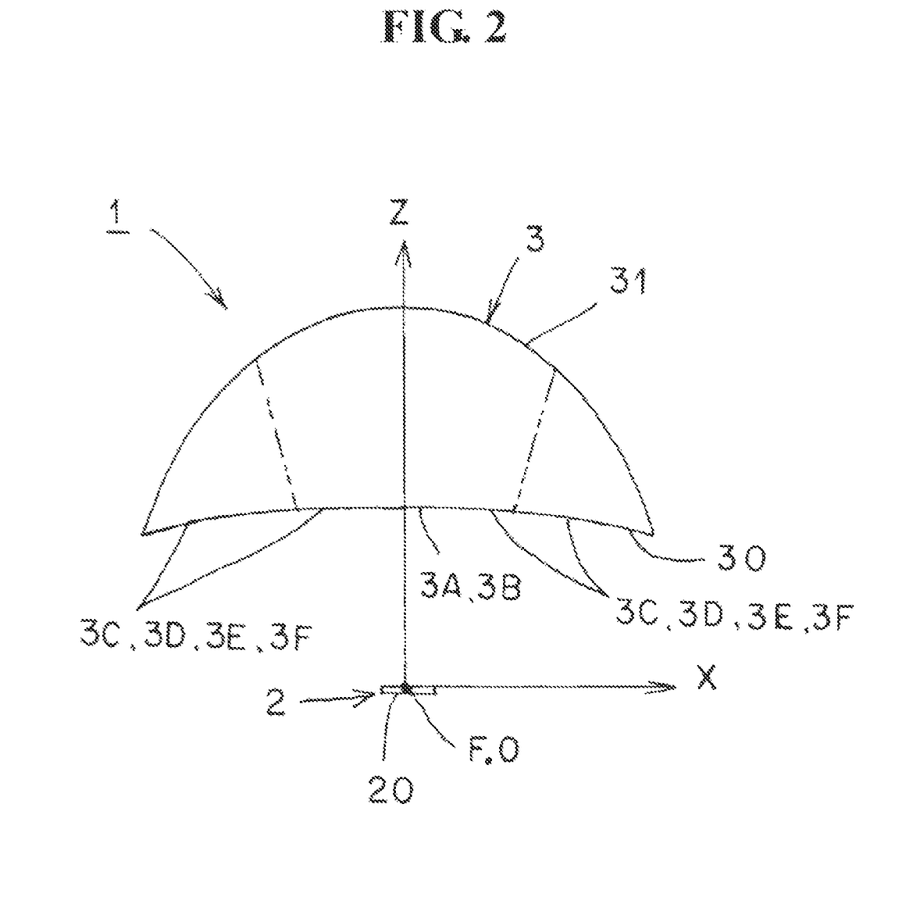
FIG. 2 is a plan view (a view taken along the arrow II in FIG. 1) showing a lens and a semiconductor-type light source.
Figure 3:
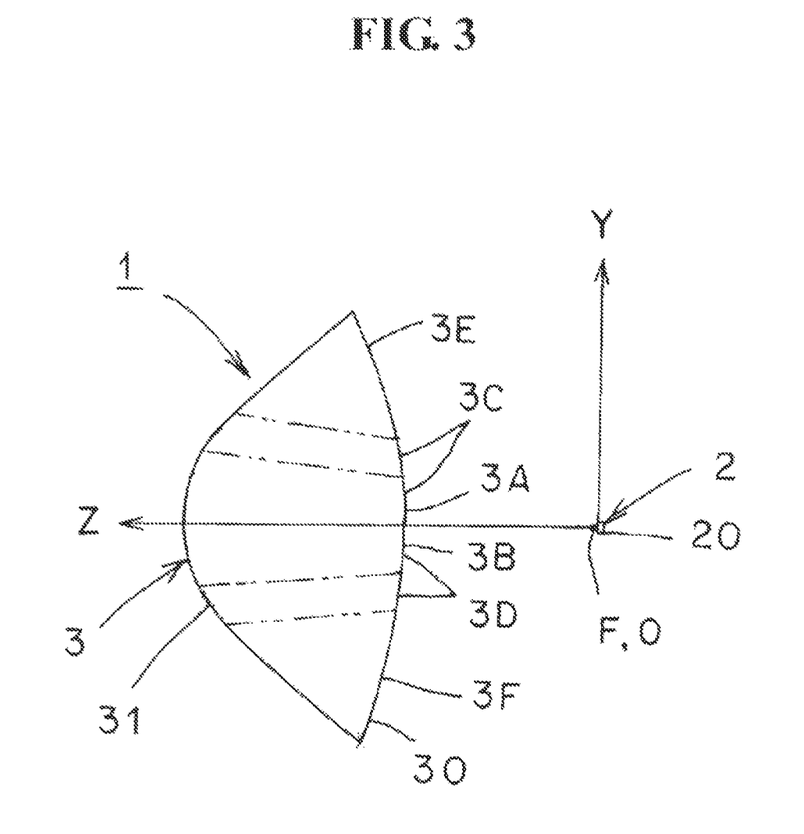
FIG. 3 is a side view (a view taken along the arrow III in FIG. 1) showing a lens and a semiconductor-type light source.

The vehicle headlamp 1 comprises, as shown in FIGS. 1 to 3, a lamp housing (not shown), a lamp lens (not shown), a semiconductor-type light source 2, a lens 3, and a heat sink member (not shown).

(Description of Lamp Unit 2, 3)

The semiconductor-type light source 2, lens 3 and the heat sink member configure a lamp unit. The lamp housing and the lamp lens define a lamp chamber (not shown). The lamp units 2, 3 are arranged in the lamp chamber, and attached to the lamp housing via a vertical direction optical axis adjustment mechanism (not shown) and a horizontal direction optical axis adjustment mechanism (not shown).

(Description of Semiconductor-type Light Source 2)

The semiconductor-type light source 2 is, as shown in FIGS. 1 to 3, a self-emitting semiconductor-type light source, for example, an LED, OEL, or OLED (organic EL) in this example. The semiconductor-type light source 2 comprises one or a plurality of emitting chips (not shown), a light emitting part (package, LED package) 20 sealing the light-emitting chip with a sealing resin member, and a substrate mounting the light emitting part 20 (not shown). When two or more light-emitting chips are used, they are aligned in the X-axis direction (horizontal direction).

The substrate is fixed to the heat sink member. As a result, the semiconductor-type light source 2 is held by (fixed to) the heat sink member. The semiconductor-type light source 2 is electrically connected to a power supply (battery). The light-emitting surface of the light emitting part 20 of semiconductor-type light source 2 in provided on the front side in a horizontal direction. The center of the light emitting surface (light emission center) O of the light emitting part 20 is located at a reference focal point F of the lens 3, or in the proximity thereof, and is located on the reference optical axis (reference axis) Z of the lens 3, or in the proximity thereof.

In FIGS. 1 to 3, X, Y, Z constitute an orthogonal coordinate (X-Y-Z orthogonal coordinate system). The X-axis is a horizontal axis in the lateral direction passing through the light emission center O of the light emitting part 20, and in the embodiment, the right side is a + direction, and the left side is a − direction. The Y-axis is a vertical axis passing through the light emission center O of the light emitting portion, and in the embodiment, the upper side is a + direction, and the lower side is a − direction. Further, the Z-axis is a normal line (perpendicular line) passing through the light emission center O of the light emitting part 20, that is, an axis in the longitudinal direction orthogonal to the X-axis and Y-axis, and in the embodiment, the front side is a + direction, and the rear side is a − direction.

(Description of Lens 3)

The lens 3 comprises, as shown in FIGS. 1 to 3, an incident surface 30 that enters the light from the semiconductor-type light source 2 into the lens 3, and an exit surface that emits the light entered into the lens 3. The incident surface 30 comprises a composite secondary surface that a surface in the horizontal direction forms a concave surface with respect to the semiconductor-type light source 2 (see FIG. 2), and a surface in the vertical direction forms a convex surface with respect to the semiconductor-type light source 2 (see FIG. 3). The exit surface 31 forms a convex shape projecting to the opposite side of the semiconductor-type light source 2, and comprises a free-form surface.

The lens 3 is attached to the heat sink member directly or via a holder member (not shown). The lens 3 radiates the light directly entered from the semiconductor-type light source 2 forward of a vehicle as a high beam light distribution pattern HP shown in FIG. 5.

The lens 3 is configured of an upper part and a lower part. In other words, the lens 3 is configured in three pairs, so that the upper part and the lower part, which are in a vertically symmetrical relationship, form a pair with respect to the horizontal line (the X axis) passing through the reference optical axis Z. In the example, a first upper part 3A and a first lower part 3B form a first pair, a second upper part 3C and a second lower part 3D form a second pair, and a third upper part 3E and a third lower part 3F form a third pair. The upper parts 3A, 3C, 3E and the lower parts 3B, 3D, 3F are partitioned by the two-dot chain line in FIGS. 2 and 3.

The first upper part 3A is provided in a range of latitude 0° to about +15° and longitude about ±30° of the incident surface 30. The first lower part 3B is in a vertically symmetrical relationship with the first upper part 3A, and is provided in a range of latitude 0° to about −15° and longitude about ±30° of the incident surface 30. The second upper part 3C is provided in the remaining range of the incident surface 30, excluding the range of the first upper part 3A from the range of latitude 0° to about +30° and longitude about ±55°. The second lower part 3D is in a vertically symmetrical relationship with the second upper part 3C, and is provided in the remaining range of the incident surface 30, excluding the range of the first lower part 3B from the range of latitude 0° to about −30° and longitude about ±55°. The third upper part 3E is provided in a range of latitude +30° to about +55° and longitude about ±55° of the incident surface 30. The third lower part 3F is in a vertically symmetrical relationship with the third upper part 3E, and is provided in a range of latitude −30° to about −55° and longitude about ±35° of the incident surface 30. Also, in the exit surface 31, the upper parts 3A, 3C, 3E and the lower parts 3B, 3D, 3F are provided respectively in the ranges corresponding to the ranges of the incident surface 30.

The above latitude is an angle formed by the Z axis and a straight line connecting the light emission center O of the light emitting part 20 and a point on the Y axis. The above longitude is an angle formed by the Z axis and a straight line connecting the omission center of the light emitting part 20 and a point on the X axis. A boundary line between the upper parts 3A, 3C, 3E and the lower parts 3B, 3D, 3F is indicated by a solid line in FIG. 1, and by a two-dot chain line in FIGS. 2 and 3.

The first upper part 3A and the first lower part 3B of the first pair form a condensed light distribution pattern SPA (see FIG. 4 (A)) and a condensed light distribution pattern SPB (see FIG. 4 (B)), respectively, of the high beam light distribution pattern HP. The second upper part 3C and the second lower part 3D of the second pair form a large diffused light distribution pattern WPC (see FIG. 4 (C)) and a large diffused light distribution pattern WPD (see FIG. 4 (D)), respectively, of the high beam light distribution pattern HP. The third upper part 3E and the third lower part 3F of the third pair form a medium diffused light distribution pattern WPE (see FIG. 4 (E)) and a medium diffused light distribution pattern WPF (see FIG. 4 (F)), respectively, of the high beam light distribution pattern HP.

The lens 3 comprises a first part including the reference optical axis Z, and a second part around the first part. In other words, the lens 3 comprises a first part that forms the condensed light distribution patterns SPA and SPB of the high beam light distribution pattern HP, and a second part that forms the large diffused light distribution patterns WPC and WPD, and the medium diffused light distribution patterns WPE and WPF of the high beam light distribution pastern HP. As a result, the first part comprises the first upper part 3A and the first lower part 3B of the first pair. The second part comprises the second upper part 3C and the second lower part 3D of the second pair, and the third upper part 3E and the third upper part 3F of the third pair.

The incident surface 30 and the exit surface 31 of the lens 3 are configured to perform light distribution control of the light from the semiconductor-type light source 2, as follows. In other words, the condensed light distribution pattern SPA formed by the first upper part 3A is shifted about 0.9° upward relative to the condensed light distribution pattern SPB formed by the first lower part 3B. The large diffused light distribution pattern WPC formed by the second upper part 3C is shifted about 0.4° upward relative to the large diffused light distribution pattern WPD formed by the second lower part 3D. Further, the medium diffused light distribution pattern WPE formed by the third upper part 3E is shifted about 1.2° upward relative to the medium diffused light distribution pattern WPF formed by the third lower part 3F.

(Description of Functions of the Embodiment)

The vehicle headlamp according to the embodiment has the above configuration. Hereinafter, the functions of the embodiment will be described.

When the light emitting part 20 of the semiconductor-type light source 2 is turned on, the light emitted from the light emitting part 20 enters directly into the lens 3 from the incident surface 30 of the lens 3. At this time, the incident light is subjected to light distribution control by the incident surface 30. The incident light that has entered into the lens 3 exits from the exit surface 31 of the lens 3. At this time, the exit light is subjected to light distribution control by the exit surface 31. The exit light from the lens 3 is, as shown in FIG. 5, emitted forward of a vehicle as a high beam light distribution pattern HP having a hot zone HZ (high luminous intensity zone).

In other words, the light that has entered into the incident surface 30 of the first upper part 3A of the lens 3 and exited from the exit surface 31, radiates forward of a vehicle as a condensed light distribution pattern SPA shown in FIG. 4 (A). The light that has entered into the incident surface 30 of the first lower part 3B of the lens 3 and exited from the exit surface 31, radiates forward of a vehicle as a condensed light distribution pattern SPB shown in FIG. 4 (B). At this time, by chromatic aberrations of the lens 3, in the condensed light distribution pattern SPA formed by the first upper part 3A, as shown in FIG. 4 (A), a red band R occurs in the upper peripheral part, and a blue band B occurs in the lower peripheral part, as shown in FIG. 4 (A). On the other hand, by chromatic aberrations of the lens 3, in the condensed light distribution pattern SPB formed by the first lower part 3B, as shown in FIG. 4 (A), a blue band B occurs in the upper peripheral part, and a red band R occurs in the lower peripheral part, as shown in FIG. 4 (B).

The light that has entered into the incident surface 30 of the second upper part 3C of the lens 3 and exited from the exit surface 31, radiates forward of the vehicle as a large diffused light distribution pattern WPC shown in FIG. 4 (C). The light that has entered into the incident surface 30 of the second lower part 3D of the lens 3 and exited from the exit surface 31, radiates forward of a vehicle as a large diffused light distribution pattern WPD shown in FIG. 4 (D). At this time, by chromatic aberrations of the lens 3, in the large diffused light distribution pattern WPC formed by the second upper part 3C, a red band R occurs in the upper peripheral part, and a blue band B occurs in the lower peripheral part as shown in FIG. 4 (C). On the other hand, by chromatic aberrations of the lens 3, in the large diffused light distribution pattern WPD formed by the second lower part 3D, a blue band B occurs in the upper peripheral part, and a red band R occurs in the lower peripheral part, as shown in FIG. 4 (D).

Further the light that has entered into the incident surface 30 of the third upper part 3E of the lens 3 and exited from the exit surface 31, radiates forward of a vehicle as a medium diffused light distribution pattern WPE shown in FIG. 4 (E). The light that has entered into the incident surface 30 of the third lower part 3F of the lens 3 and exited from the exit surface 31, radiates forward of a vehicle as a medium diffused light distribution pattern WPF shown in FIG. 4 (F). At this time, by chromatic aberrations of the lens 3, in the medium diffused light distribution pattern WPE formed by the third upper part 3E, a red band R occurs in the upper peripheral part, and a blue band B occurs in the lower peripheral part, as shown in FIG. 4 (E). On the other hand, by chromatic aberrations of the lens 3, in the medium diffused light distribution pattern WPF formed by the third lower part 3F, a blue band B occurs in the upper peripheral part, and a red band R occurs in the lower peripheral part, as shown in FIG. 4 (F).

Here, the condensed light distribution pattern SPA formed by the first upper part 3A is, as shown in FIGS. 4 (A), (B), shifted about 0.9° upward relative to the condensed light distribution pattern SPB formed by the first lower part 3B. As a result, the red band R in the upper peripheral part of the condensed light distribution pattern SPA formed by the first upper part 3A substantially overlaps on the blue band B in the upper peripheral part of the condensed light distribution pattern SPB formed by the first lower part 3B, and the red and blue cancel each other. Further, the blue band B in the lower peripheral part of the condensed light distribution pattern SPA formed by the first upper part 3A substantially overlaps on the red band R in the lower peripheral part of the condensed light distribution pattern SPB formed by the first lower part 3B, and the red and blue cancel each other.

Furthermore, the large diffused light distribution pattern WPC formed by the second upper part 3C is, as shown in FIGS. 4(C), (D), shifted about 0.4° upward relative to the large diffused light distribution pattern WPD formed by the second lower part 3D. As a result, the red band R in the upper peripheral part of the large diffused light distribution pattern WPC formed by the second upper part 3C substantially overlaps on the blue band B in the upper peripheral part of the large diffused light distribution pattern WPD formed by the second lower part 3D, and the red and blue cancel each other. Further, the blue band B in the lower peripheral part of the large diffused light distribution pattern WPC formed by the second upper part 3C substantially overlaps on the red band R in the lower peripheral part of the large diffused light distribution pattern WPD formed by the second lower part 3D, and the red and blue cancel each other.

Furthermore, the medium diffused light distribution pattern SPE formed by the third upper part 3E is, as shown in FIGS. 4 (E), (F), shifted about 1.2° upward relative to the medium diffused light distribution pattern SPF formed by the third lower part 3F. As a result, the red band R in the upper peripheral part of the medium diffused light distribution pattern WPE formed by the third upper part 3E substantially overlaps on the blue band B in the upper peripheral part of the medium diffused light distribution pattern WPF formed by the third lower part 3F, and the red and blue cancel each other. Further, the blue band B in the lower peripheral part of the medium diffused light distribution pattern WPE formed by the third upper part 3E substantially overlaps on the blue band B in the lower peripheral part of the medium diffused light distribution pattern WPF formed by the third lower part 3F, and the red and blue cancel each other.

Therefore, a high beam light distribution pattern HP, that the occurrence of color bands is suppressed based on the principle of color mixing, radiates forward of a vehicle.

(Description of Effects of the Embodiment)

The vehicle headlamp 1 according to the embodiment has the above configuration and functions. Hereinafter, the effects of the embodiment will be described.

In the vehicle headlamp 1 according to the embodiment, the lens 3 is configured of upper parts 3A, 3C, 3E and lower parts 3B, 3D, 3F. Thus, due to chromatic aberrations of the lens 3, in the light distribution patterns SPA, WPC, WPE formed by the upper parts 3A, 3C, 3E, a red band R occurs in the upper peripheral part, and a blue band B occurs in the lower peripheral part. On the other hand, due to chromatic aberrations of the lens 3, in the light distribution patterns SPB, WPD, WPF formed by the lower parts 3B, 3D, 3F the blue band B occurs in the upper peripheral part, and the red band R occurs in the lower peripheral part.

In the vehicle headlamp 1 according to the embodiment, the light distribution patterns SPA, WPC, WPE formed by the upper parts 3A, 3C, 3E are shifted upward relative to the light distribution patterns SPB, WPD, WPF formed by the lower parts 3B, 3D, 3F. As a result, in the vehicle headlamp 1 according to the embodiment, the red band R in the upper peripheral part of the light distribution patterns SPA, WPC, WPE formed by the upper parts 3A, 3C, 3E substantially overlaps on the blue band B in the upper peripheral part of the light distribution patters SPB, WPD, WPF formed by the lower parts 3B, 3D, 3F. Further, the blue band B in the lower peripheral part of the light distribution patterns SPA, WPC, WPE formed by the upper parts 3A, 3C, 3E substantially overlaps on the red band R in the lower peripheral part of the light distribution patterns SPB, WPD, WPF formed by the lower parts 3B, 3D, 3F. Thus, based on the principle of color mixing (additive mixing), it is possible to suppress the occurrence of color bands due to spectral phenomena of a lens.

Since the light distribution patterns SPA, WPC, WPE formed by the upper parts 3A, 3C, 3E are shifted upward relative to the light distribution patterns SPB, WPD, WPF formed by the lower parts 3B, 3D, 3F, the vehicle headlamp 1 according to the embodiment is able to suppress the occurrence of a blue hand B (a band of blue color) whose band width becomes wider in accordance with the refractive index depending on the wavelength.

Since the light distribution patterns SPA, WPC, WPE formed by the upper parts 3A, 3C, 3E are shifted upward relative to the light distribution patterns SPB, WPD, WPF formed by the lower parts 3B, 3D, 3F the vehicle headlamp 1 according to the embodiment is optimal for a high beam light distribution pattern HP.

(Description of Modifications of the Embodiment)

A micro-diffusion element group is provided in a part of at least one of the second parts 3C, 3D, 3E, 3F of the incident surface 30 of the lens 3 and the exit surface 31.

A part of the second parts 3C, 3D, 3E, 3F is, at maximum, the part above the upper boundary line of the first upper part 3A (the upper boundary line indicated by the two-dot chain line in FIG. 1, that is, the boundary line of latitude about +15°), and the part below the lower boundary line of the first lower part 3B (the lower boundary line indicated by the two-dot chain line in FIG. 1, that is, the boundary line of latitude about −15°). In other words, a part of the second parts 3C, 3D, 3E, 3F is, at maximum, the part above the upper boundary line of the first upper part 3A of the second upper part 3C, the third upper part 3E, the part below the lower boundary line of the first lower part 3B of the second lower part 3D, and the third lower part 3F.

The micro-diffusion element group is configured of a concave surface, a convex surface, or an uneven surface of a micrometer order. Thus, light entering the micro-diffusion element group diffuses. Further, the micro-diffusion element group may be provided on all surfaces of the incident surface 30 and the exit surface 31, except the first part 3A, 3B.

In the modification, a micro-diffusion element group is provided at least in a part of the second parts 3C, 3D, 3E, 3F of the lens 3, that is, the upper and lower end portions of one of the incident surface 30 and the exit surface 31 of the lens 3. Thus, when light reaches the micro-diffusion element group in the upper and lower end portions of at least one of the incident surface 30 and the exit surface 31 of the lens 3, the light diffuses. Therefore, the red band R in the upper peripheral part of the light distribution patterns WPC, WPE formed by the upper parts 3C, 3E substantially overlaps on the blue band B in the upper peripheral part of the light distribution patterns WPD, WPF formed by the lower parts 3D, 3F. Further, the blue band B in the lower peripheral part of the light distribution patterns WPC, WPE formed by the upper parts 3C, 3E substantially overlaps on the red band R in the lower peripheral part of the light distribution patterns WPD, WPF formed by the lower parts 3D, 3F. Therefore, based on the principle of color mixing (additive mixing), it is possible to more securely suppress the occurrence of color bands due to spectral phenomena of a lens.

In the modification, a micro-diffusion element group is provided at least in a part of the second parts 3C, 3D, 3E, 3F of the lens 3, that is, the upper and lower end portions of one of the incident surface 30 and the exit surface 31 of the lens 3. Thus, light enters the incident surface 30 at the center of the lens 3, and exits directly from the exit surface 31. Therefore, as shown in FIG. 6, it is possible to maintain the hot zone HZ1 (high luminous intensity zone), and it is possible to obtain the high beam light distribution pattern HP1 that is able to suppress the occurrence of color bands. In other words, the high beam light distribution pattern HP1 shown in FIG. 6 is able to maintain the hot zone HZ1 substantially equal to the hot zone HZ of the high beam light distribution pattern HP shown in FIG. 5, and further, able to suppress the occurrence of color bands more securely than the high beam light distribution pattern HP shown in FIG. 5.

(Description of Examples of Other than the Embodiment)

The embodiment is configured to radiate the high beam light distribution pattern HP, HP1. However, other examples of the present invention may radiate a light distribution pattern other than the high beam light distribution pattern HP, HP1, for example, a low beam light distribution pattern and a fog lamp light distribution pattern.

Further, in the embodiment, the light distribution patterns SPA, WPC, WPE formed by the upper parts 3A, 3C, 3E are shifted upward relative to the light distribution patterns SPB, WPD, WPF formed by the lower parts 3B, 3D, 3F. However, in the present invention, the light distribution patterns SPA, WPC, WPE formed by the upper parts 3A, 3C, 3E may be shifted downward relative to the light distribution patterns SPB, WPD, WPF formed by the lower parts 3B, 3D, 3F. In this case, the present invention is suitable for a light distribution pattern having a horizontal cutoff line, such as, a low beam light distribution pattern and a fog lamp light distribution pattern. Further, in the present invention, a part of the light distribution patterns SPA, WPC, WPE formed by a part of the upper parts 3A, 3C, 3E may be shifted upward relative to a part of the light distribution patterns SPB, WPD, WPF formed by the corresponding lower parts 3B, 3D, 3F, and the other parts of the light distribution patterns SPA, WPC, WPE formed by the other parts of the upper parts 3A, 3C, 3E may be shifted downward relative to the other parts of the light distribution patterns SPB, WPD, WPF formed by the other parts of the corresponding lower parts 3B, 3D, 3F.

Still further, in the embodiment, the lens 3 is configured in three pairs, so that the upper parts 3A, 3C, 3E and the lower parts 3B, 3D, 3F, which are in a vertically symmetrical relationship, form pairs with respect to the horizontal line (the X axis) passing through the reference optical axis Z. However, in the present invention, the upper part and the lower part may be one pair, two pairs, and four pairs or more. In this case, the light distribution pattern formed by the upper part and the light distribution pattern formed by the lower part becomes a predetermined light distribution pattern of one by one, two by two, or by four or more.

Furthermore, in the embodiment, the lens 3 is, as a whole, configured in three pairs, so that the upper parts 3A, 3C, 3E and the lower parts 3B, 3D, 3F, which are in a vertically symmetrical relationship, form pairs with respect to the horizontal line (the X axis) passing through the reference optical axis Z. However, in the present invention, a part of the lens 3 may be configured in one pair or more pairs, so that the upper part and the lower part, which are in a vertically symmetrical relationship, form a pair with respect to the horizontal line (the X axis) passing through the reference optical axis Z. For example, the first upper part 3A and the first lower part 3B may form a pair, and the other parts may not form a pair, and may be an ordinary incident surface.

DESCRIPTION OF REFERENCE NUMERALS

1 Vehicle headlamp
2 Semiconductor-type light source
20 light emitting part
3 Lens
30 Incident surface
31 Exit surface
3A First upper part
3B First lower part
3C Second upper part
3D Second lower part
3E Third upper part
3F Third lower part
B Blue band
F Reference focal point of lens
HL-HR Left and right horizontal line of screen
HP, HP1 High beam light distribution pattern
HZ, HZ1 Hot zone
O Light emission center
R Red band
SPA, APB Condensed light distribution pattern
VU-VD Upper and lower vertical line of screen
WPC, WPD Large diffused light distribution pattern
WPE, WPF Medium diffused light distribution pattern
X X axis
Y Y axis
Z Reference optical axis of lens (Z axis)

The invention claimed is:

1. A vehicle headlamp comprising a semiconductor-type light source and a lens, wherein:
an emission center of the semiconductor-type light source is arranged at a reference focal point of the lens, or in the proximity of the reference focal point,
at least a part of the lens is configured of an upper part and a lower part, the upper part and the lower part being arranged with such a vertical symmetrical relationship that light distribution patterns formed respectively by the upper part and the lower part have in corresponding peripheral parts thereof different color bands caused by spectral phenomena of the lens, and
one of the light distribution pattern formed by the upper part and the light distribution pattern formed by the lower part is shifted relatively to the other, and the different color bands in the corresponding peripheral parts cancel each other.

2. The vehicle headlamp according to claim 1, wherein:
the lens is configured of a first part including a reference optical axis, and a second part around the first part, and
a micro-diffusion element group is provided in at least one of an incident surface and an exit surface of the second part.

3. The vehicle headlamp according to claim 1, wherein the light distribution pattern formed by the upper part is shifted upward relative to the light distribution pattern formed by the lower part.

4. The vehicle headlamp according to claim 1, wherein the light distribution pattern formed by the lower part is shifted downward relative to the light distribution pattern formed by the upper part.

5. The vehicle headlamp according to claim 1, wherein an amount of the relative shift between the light distribution pattern formed by the upper part and the light distribution pattern formed by the lower part is such that the corresponding peripheral part of the upper part and the corresponding peripheral part of the lower part overlap.

6. The vehicle headlamp according to claim 1, wherein the light distribution pattern formed by the upper part has a red band in a first upper peripheral part, the light distribution pattern formed by the lower part has a blue band in a second upper peripheral part, and the red band in the first upper peripheral part and the blue band in the second upper peripheral part are canceled in accordance with the relative shift between the upper part and the lower part.

* * * * *